United States Patent [19]
Ikeda et al.

[11] Patent Number: 6,069,665
[45] Date of Patent: May 30, 2000

[54] ADDITIONAL INFORMATION SUPERIMPOSITION DEVICE

[75] Inventors: Nozomu Ikeda, Tokyo; Akira Ogino, Chiba, both of Japan

[73] Assignee: Sony Corporation, Tokyo, Japan

[21] Appl. No.: 09/084,416

[22] Filed: May 27, 1998

[30] Foreign Application Priority Data

May 29, 1997 [JP] Japan .................................... 9-139757

[51] Int. Cl.$^7$ ...................................................... H04N 7/08
[52] U.S. Cl. .................. 348/478; 386/94; 380/5
[58] Field of Search .................... 348/473, 476, 348/478; 386/94; 380/5, 10; 375/200; 360/60

[56] References Cited

U.S. PATENT DOCUMENTS

| | | |
|---|---|---|
| 3,984,624 | 10/1976 | Waggener . |
| 5,311,323 | 5/1994 | Honda ...................................... 386/94 |
| 5,315,448 | 5/1994 | Ryan ........................................ 360/60 |
| 5,459,583 | 10/1995 | Nakata ...................................... 386/94 |
| 5,537,216 | 7/1996 | Yamashita et al. ....................... 386/94 |
| 5,761,302 | 6/1998 | Park ............................................ 380/5 |
| 5,778,064 | 7/1998 | Kori et al. .................................. 380/5 |
| 5,953,417 | 9/1999 | Quan ........................................... 380/5 |

FOREIGN PATENT DOCUMENTS

| | | |
|---|---|---|
| 0360615 | 3/1990 | European Pat. Off. . |
| 0400906 | 12/1990 | European Pat. Off. . |
| 0838946 | 4/1998 | European Pat. Off. . |

*Primary Examiner*—Victor R. Kostak
*Attorney, Agent, or Firm*—Jay H. Maioli

[57] ABSTRACT

Additional information is superimposed consistently while the disturbance of a picture due to excessive superimposition is suppressed. The device superimposes a spectrally spread additional information on a video signal. Inverse spread processing is performed on the video signal, and an SS additional information detection circuit detects whether additional information is superimposed already on the video signal. Based on the detection result performed by the additional information detection circuit, superimposition of the spectrally spread signal supplied from the spectrally spread signal generator on the video signal is controlled. A superimposition control method such as superimposition ON/OFF control, superimposition level control, or spread code string control is performed.

8 Claims, 10 Drawing Sheets

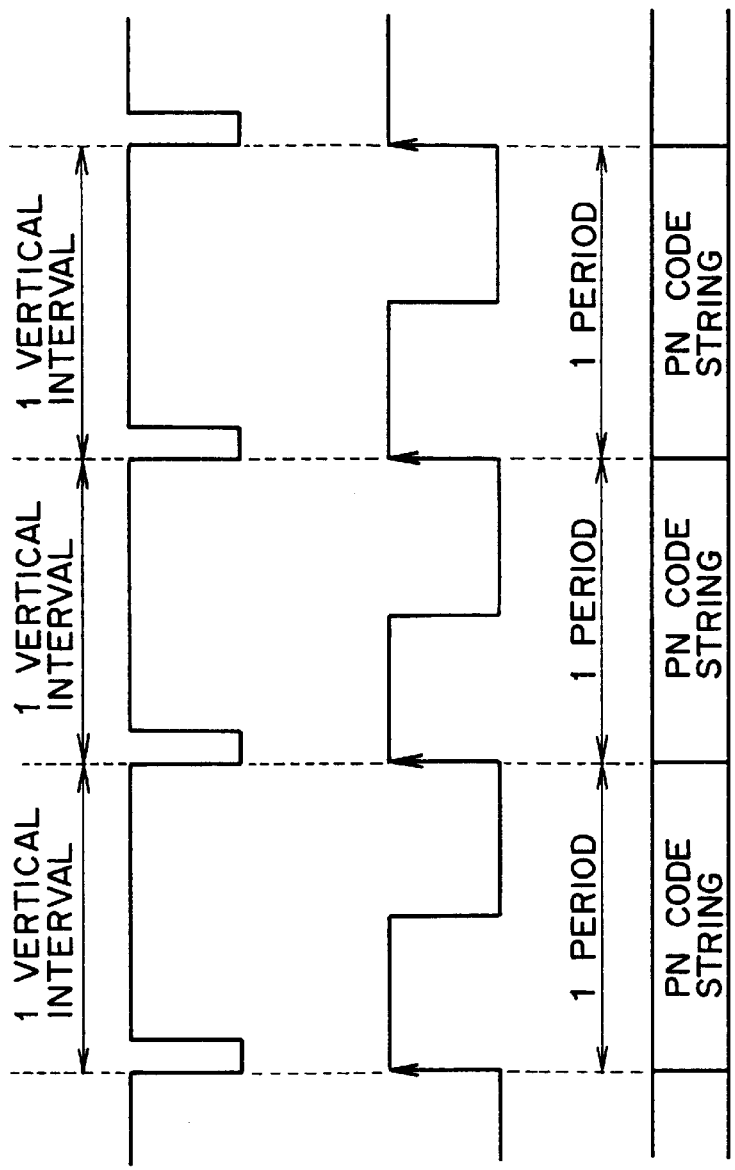

SPECTRUM OF ADDITIONAL INFORMATION BEFORE SPECTRAL SPREAD

SPECTRUM OF ADDITIONAL INFORMATION AFTER SPECTRAL SPREAD

SPECTRUM OF VIDEO SIGNAL HAVING SS ADDITIONAL INFORMATION SUPERIMPOSED THEREON

SIGNAL SPECTRUM AFTER INVERSE SPREAD

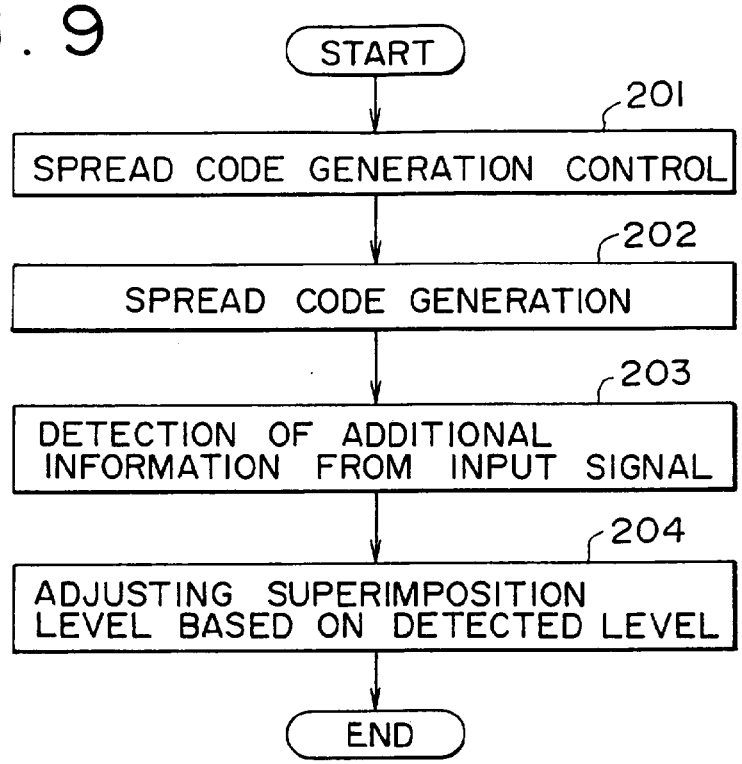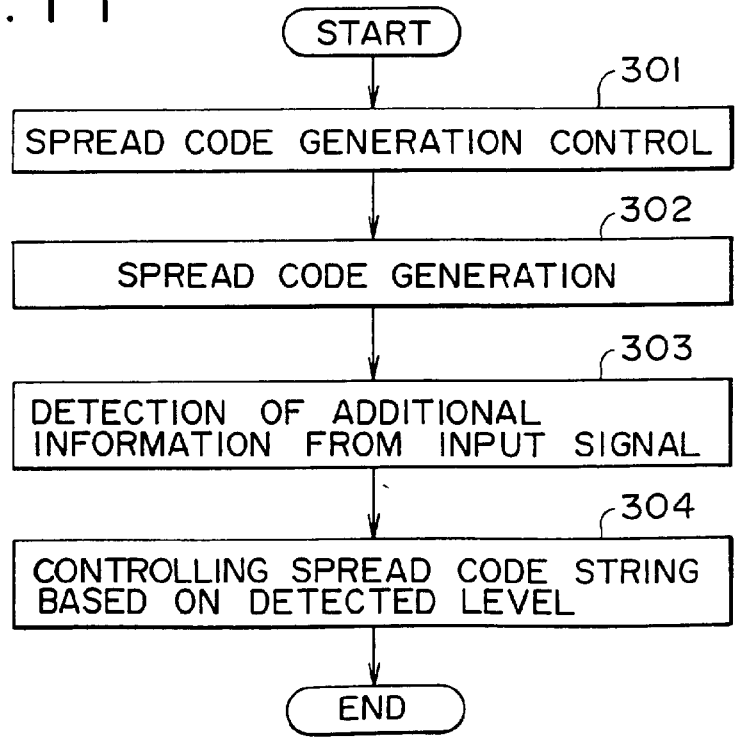

ADDITIONAL INFORMATION SUPERIMPOSITION DEVICE

BACKGROUND OF THE INVENTION

1. Field of the Invention

This invention relates to an additional information superimposition device for superimposing additional information such as anti-duplication control information on a video signal which is suitably used for a video device, for example, a recording/playback device of video signals such as a VTR.

2. Description of Related Art

VTR (Video Tape recording devices) has been popularized in daily life, and many kinds of software which can be played back on a VTR are supplied abundantly. Digital VTR or DVD (Digital Video Discs) playback devices have been available now, and provide images and sound of exceptionally high quality.

On the other hand, there is, however, a problem that this great abundance of software can be copied without restriction, and heretofore video signals on which various kinds of additional information for preventing duplication have been used for recording and transmission.

For example, a pseudo sync signal of extraordinarily high level is inserted in a vertical blanking period as a sync signal for AGC (Auto Gain Control) of a monitor receiver, or information for preventing duplication is superimposed in a specified horizontal interval of a vertical blanking period for involving analog video signal.

In the case of a digitized video signal, an anti-duplication signal or an anti-duplication control signal comprising, for example, a duplication generation control code, is added as digital data to the video signal and recorded on the recording medium, so as to prevent or control duplication of the image directly.

It is desirable for the secret additional information such as the above-mentioned information for preventing duplication that the additional information is difficult to be removed from a video signal. However, from the above-mentioned video signal on which additional information is superimposed as information on a vertical blanking period, the additional information is removed very easily by exchanging the vertical blanking period.

Additional information added to a digital video signal is played back as a separate signal from the digital video signal, the anti-duplication control signal namely the additional information is removed and not included in the analog video signal which was D/A converted and guided to an analog output terminal for monitoring the played back video signal. Therefore, even though a digital apparatus is used, in the case of analog connection in which an analog VTR is connected to an analog output terminal, the video signal is duplicated undesirably.

To prevent such undesirable duplication, direct superimposition addition of an anti-duplication control signal is considered to be a method. However, it is generally difficult that an anti-duplication control signal is added without deterioration of a D/A converted video signal and extracted in a recording device for duplication prevention control.

As an additional information superimposition method effective for both analog and digital systems which solves the above-mentioned problems without deterioration of a played back picture, the inventors of this invention previously proposed a method that additional information such as an anti-duplication control signal was spectrally spread and the additional information namely the spectrally spread anti-duplication control signal was superimposed on a video signal (refer to Japanese Patent Application No. Hei-7-339959 and Japanese Patent Application No. Hei-8-322329).

According to this method, a PN (Pseudorandom Noise) sequence code (referred to hereinafter as PN code) used as a spread code is generated with a sufficiently short period and spectrally spread by multiplying it by the anti-duplication control signal. In this way, a narrow-bandwidth high-level anti-duplication control signal is converted to a wide-band low-level signal which does not affect the video signal. This spectrally spread anti-duplication control signal is then superimposed on the analog video signal or digital video signal to be outputted as a playback output and the analog video signal or digital video signal to be recorded. The video signal to be recorded on a recording medium may be either an analog signal or digital signal.

In this method, the additional information such as an anti-duplication control signal superimposed on a video signal as a spectrally spread wide-band low-level signal, it is therefore difficult to remove the additional information such as the superimposed anti-duplication control signal.

However, it is possible to detect and use the superimposed and spectrally spread additional information by performing inverse spectral spread. The additional information such as the anti-duplication control signal is supplied consistently to the recording device side together with the video signal, and the recording device side detects the additional information and performs duplication control consistently corresponding to the detected additional information.

In some cases, additional information is additionally superimposed and added to the video signal on which the above-mentioned spectrally spread additional information has been already superimposed.

For example, it is considered that information for searching a duplication route such as a VTR device number is superimposed on an analog video signal or digital video signal as the above-mentioned spectrally spread additional information, in some cases the same additional information is already superimposed on the input video signal when the additional information is superimposed in a playback device or recording device, in such a case the spectrally spread additional information is superimposed again additionally regardless of the already superimposed additional information.

In the case that a digital video signal or analog video signal is transmitted through a transmission path having a low-pass filter characteristic, in order to compensate deterioration of the additional information due to the low-pass filter of the transmission path, in some cases the same additional information is superimposed again additionally on the way of transmission.

However, such additional superimposition of the spectrally spread additional information can cause a bright-and-dark stripe pattern on a played back picture, which is visually perceptible, because the level of the superimposed additional information becomes higher, though which level is originally sufficiently low so that the played picture is not deteriorated. Even though the additionally superimposed spectrally spread signal is not the quite same as the already superimposed spectrally spread additional information, the played back picture can be affected because the level of the same spread signal portion becomes higher.

Such perceptible additional information loses its secrecy, and the loss of secrecy is disadvantageous if the additional information is secret information such as the above-mentioned anti-duplication control signal or information for searching a duplication route.

It is the object of the present invention to provide an information addition device for superimposing and adding spectrally spread additional information on a video signal which is capable of preventing deterioration of a picture due to additional superimposition of additional information and preventing loss of secrecy of the additional information as described herein above.

SUMMARY OF THE INVENTION

The present invention provides an additional information signal superimposition device for superimposing a spectrally spread additional information on an information signal provided with a spectral spread signal generation means for generating the spectral spread additional information signal by spectrally spreading the additional information signal, a spectral spread signal detection means for detecting the input spectral spread additional information signal superimposed on the input information signal, and a superimposition means for receiving the generated spectral spread additional information signal from the spectral spread generation means and for superimposing the generated spectral spread additional information signal on the input information signal correspondingly to the detection result obtained by the spectral spread signal detection means on the input spectral spread additional information signal.

The information signal is preferably a video signal. The superimposition means is provided with an output control means for outputting the generated spectral spread additional information signal selectively corresponding to the detection result obtained by the spectral spread signal detection means on the input spectral spread additional information signal, a superimposition level control means for outputting the level of the generated spectral spread additional information signal adjusted correspondingly to the detection result obtained by the spectral spread signal detection means on the input spectral spread additional information signal or a spread code string control means for converting a code 1 of the generated spectral spread additional information signal to a code 0 to output correspondingly to the detection result obtained by the spectral spread signal detection means on the input spectral spread additional information signal, and an addition means for superimposing the generated spectral spread additional information signal outputted from the output control means on the input spectral spread additional information signal.

In the case of the superimposition control means having the output control means, the spectral spread signal detection means detects whether the spectral spread additional information signal in the information signal is a signal of a prescribed level or higher. If the spectral spread additional information is the signal of the prescribed level or higher, then, for example, the superimposition control means does not superimpose the spectral spread additional information signal supplied from the spectral spread signal generation means. As the result, the level of the spectral spread additional information signal does not rise excessively, and deterioration of the information signal due to additional superimposition of the additional information signal is prevented.

In the case of the superimposition control means having the superimposition level control means, the spectral spread signal detection means detects the level magnitude of the spectral spread additional information signal in the information signal. Depending on the detected result, the superimposition control means additionally superimposes a spectral spread additional information signal having a level corresponding to the detected level.

To sum up, when an information signal, for example, spectral spread additional information in a video signal, is deteriorated due to characteristics of a transmission line, the spectral spread additional information is additionally superimposed. On the other hand, when the spectral spread additional information in the video signal is not deteriorated, the spectral spread additional information is not superimposed, and deterioration of the playback video signal due to excessive additional superimposition of the additional information signal is prevented.

In the case of the superimposition control means having the superimposition level control means, the spectral spread signal detection means detects the level magnitude of the spectral spread additional information signal in the information signal. Depending on the detected result, the superimposition control means additionally superimposes the additional information signal from which the code string of the spectral spread signal is thinned correspondingly to the detected level.

BRIEF DESCRIPTION OF THE DRAWINGS

FIGS. 5A to 5C are diagrams for showing a timing chart for describing the embodiment shown in FIG. 1.

FIG. 9 is a flow chart of the second embodiment realized using a software.

FIG. 11 is a flow chart of the third embodiment realized using a software.

DETAILED DESCRIPTION OF THE PREFERRED EMBODIMENTS

Embodiments of an additional information superimposition device in accordance with the present invention will be described hereinafter in detail with reference to the drawings. The additional information superimposition device of this embodiment described hereinafter is applied, in the case that a digital video signal or analog video signal on which spectrally spread additional information is superimposed is transmitted through a transmission path having the low-pass filter characteristics, to playback devices and recording devices when the same additional information is superimposed again additionally or spectrally spread additional information is superimposed on the way of the transmission path in order to compensate deterioration of additional information due to the low-pass filter characteristics of the path.

[First embodiment]

Figure 1:
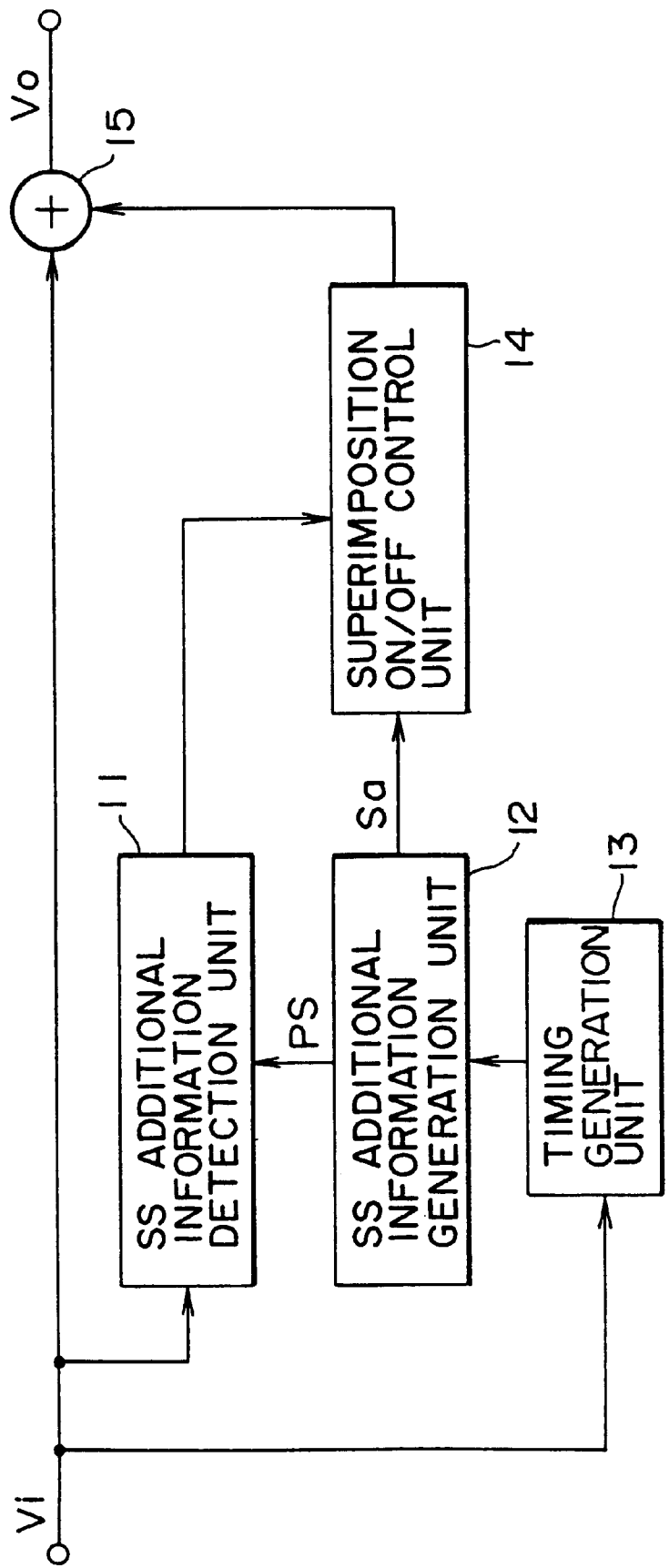
FIG. 1 is a block diagram for illustrating the first embodiment of an additional information superimposition device in accordance with the present invention.

FIG. 1 is a block diagram for illustrating the structure of an additional information superimposition device of the first embodiment. In FIG. 1, SS (SS is abbreviation of spectrally spread hereinafter) additional information detection unit 11 detects spectrally spread additional information superimposed on an input video signal Vi. The input video signal Vi may be an analog signal or a digital signal.

An SS additional information generation unit 12 generates SS additional information which is generated by spectrally spreading the same additional information as that superimposed on an input video signal Vi. In detail in this example, the SS additional information generation unit 12 generates a PN (Pseudorandom Noise) code string. The additional information FS is spectrally spread using the PN code string.

Figure 2:
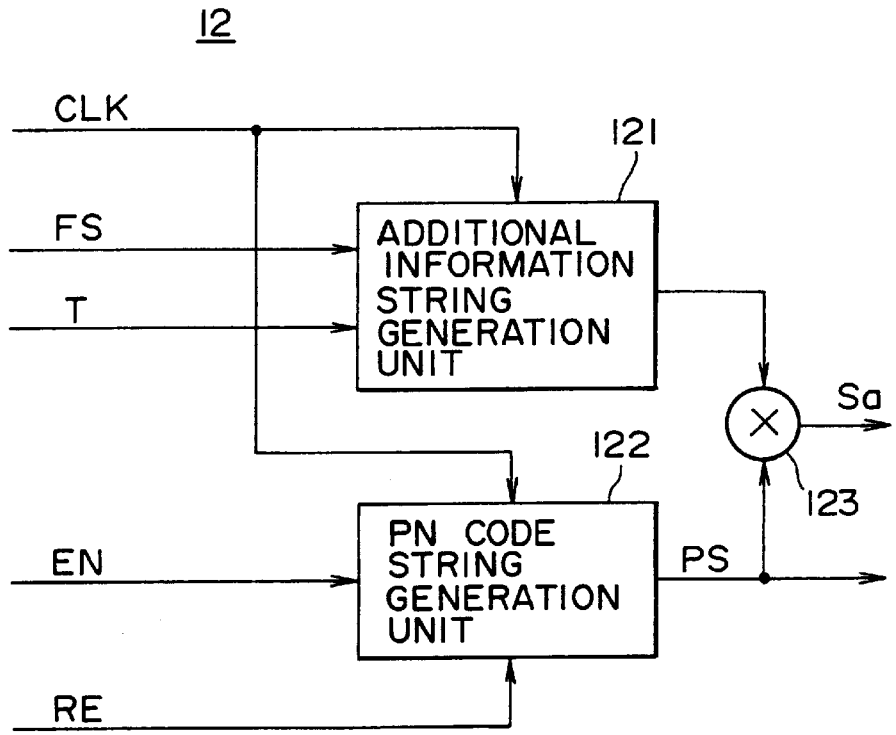
FIG. 2 is a block diagram for illustrating an SS additional information generation unit in the embodiment shown in FIG. 1.

FIG. 2 is a block diagram for illustrating an exemplary structure of the SS additional information generation unit 12 of this embodiment. As shown in FIG. 2, the SS additional information generation unit 12 is provided with an additional information string generation unit 121, a PN code string generation unit 122, and an adder 123.

The additional information string generation unit 121 receives supply of a clock signal CLK, an additional information FS, and a timing T. The timing T indicates delimiter timing of each bit of the additional information FS. The clock signal CLK is a clock signal synchronous to the input video signal Vi.

The additional information string generation unit 121 generates an additional information string by outputting the additional information FS for every bit for a predetermined number of clocks, and supplies it to the adder 123. In this example, for example, a low bit anti-duplication control signal string or copyright information string of 1 bit or 2 bits for indicating duplication inhibition or duplication permission are generated for every interval of 1 vertical period.

The PN code string generation unit 122 receives supply of a clock signal CLK, an enable signal EN, and an initialization signal (reset signal) RE. The enable signal EN is a signal for activating the PN code string generation unit 122. In this embodiment, the enable signal EN is generated when a power source is thrown in to the additional information superimposition device and supplied to the PN code string generation unit 122. The reset signal RE is a signal for generating a PN code string having a predetermined code pattern from its head.

The PN code string generation unit 122 becomes activated in response to the enable signal EN. The PN code string generation unit 122 generates a PN code string from its head for every timing when a reset signal RE is supplied, and generates the PN code string PS synchronous to the clock signal CLK. The generated PN code string PS is supplied to the adder 123.

Figure 3:
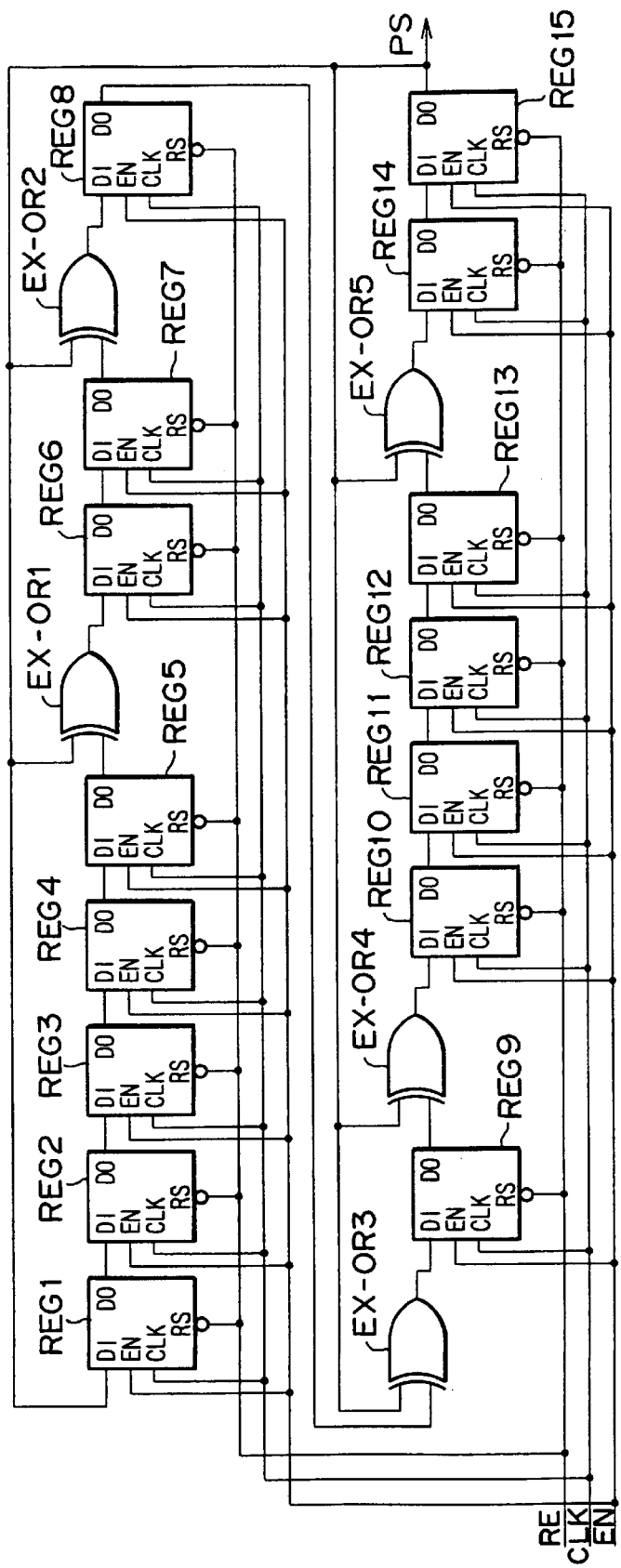
FIG. 3 is a block diagram for illustrating one example of the PN code string generation unit of the part of FIG. 2.

FIG. 3 is a exemplary structure of the PN string generation unit 122. The PN code string generation unit 122 of this example comprises 15 D-flip-flops REG1 through REG15 which constitute a 15 step shift register and exclusive OR circuits EX-OR1 through EX-OR5 for mathematically operating a proper tap output of the shift register. The PN code string generation unit 122 shown in FIG. 3 generates the PN code string PS of M series based on the reset signal RE, clock signal CLK, and enable signal EN as described herein above.

The adder 123 spectrally spreads the additional information string using the PN code string PS supplied from the PN code string generation unit 122. The adder 123 generates a spectrally spread signal (referred to as SS additional information hereinafter) namely spectrally spread additional information.

The timing generation unit 13 determines the PN code string generation timing synchronous to the input video signal Vi. In this embodiment, the PN code string is a code string synchronous to the vertical sync signal.

Figure 4:
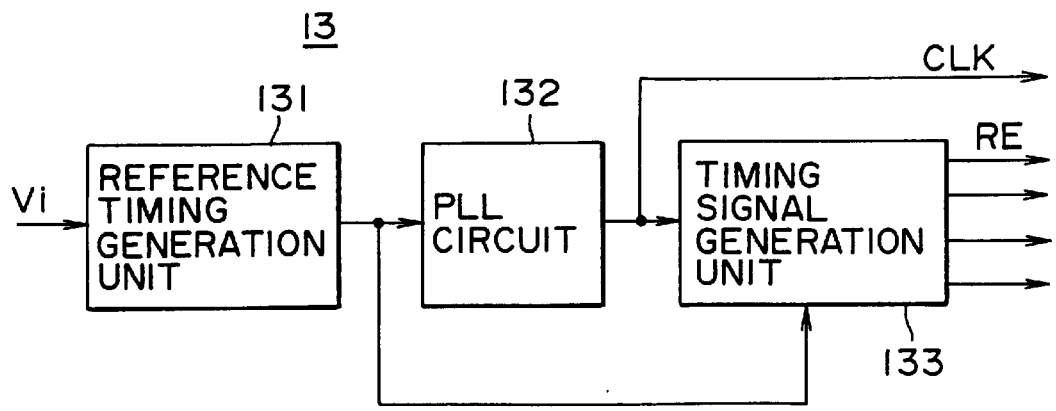
FIG. 4 is a block diagram for illustrating one example of the timing generation unit of a part of FIG. 1.

FIG. 4 is a block diagram for illustrating a detailed exemplary structure of the timing generation unit 13. As shown in FIG. 4. the timing generation unit 13 is provided with a reference timing detection unit 131, a PLL circuit 132, and a timing signal generation unit 133.

The reference timing detection unit 131 extracts a video sync signal which is served as a reference timing signal from the input video signal Vi. In this embodiment, the vertical sync signal is used as the reference timing signal, and the reference timing detection unit 131 extracts the vertical sync signal, and supplies it to the PLL circuit 132 and timing signal generation unit 133.

The PLL circuit 132 generates a clock signal CLK synchronous to the vertical sync signal. The clock signal CLK is supplied to the timing signal generation unit 133 and also supplied to the PN code string generation unit 122 shown in FIG. 3. The clock signal CLK is supplied to other processing units which require the clock signal CLK.

The timing signal generation unit 133 generates and outputs a reset signal RE for resetting the above-mentioned PN code string generation unit 122 and other various timing signals. The reset signal RE is generated as a signal which is synchronous to the vertical sync signal and has one period of 1 vertical interval. As the result, in this example, the PN code string PS generated by the PN code string generation unit 122 is a signal which is synchronous to the input video signal Vi and has a period repeating with the vertical period.

The PN code string PS generated by the PN code string generation unit 122 is supplied to the adder 123. The additional information string is supplied from the additional information string generation unit 121 to the adder 123, and the adder 123 generates a spectrally spread signal Sa generated by spectrally spreading the additional information string using the PN code string PS.

In detail, in this embodiment, the SS additional information generation unit 12 initializes the PN code string generation unit 122 synchronously to the vertical sync signal (FIG. 5A) as shown in FIG. 5 in response to the reset signal RE (FIG. 5B) repeating with a period of 1 vertical interval, and generates the PN code string PS (FIG. 5C) having a period of 1 vertical period synchronously to the clock signal CLK. Additional information, for example, an anti-duplication control signal is spectrally spread using the PN code string PS and SS additional information Sa is generated.

The spectrally spread signal Sa generated as described herein above is supplied from the SS additional information generation unit 12 to a superimposition ON/OFF control unit 14. The PN code string PS is supplied to the SS additional information detection unit 11 for inversion spread.

The SS additional information detection section 11 performs inversion spread using the PN code string PS and detects the spectrally spread additional information. In this case, the additional information is a signal which is spectrally spread in the same spectral spreading manner as used in the above-mentioned SS additional information generation unit 12 and superimposed on a video signal, wherein the additional information is spectrally spread using the PN code string PS which is synchronous to the video signal. As the result, the additional information is inversely spread relatively easily using the PN code string PS and can be detected easily.

The additional information which is spectrally spread using the PN code string PS is the information significantly correlative to the PN code string. On the other hand, the video signal has no correlation to the PN code string ideally. The SS additional information detection unit 11 calculates the degree of correlation between the input video signal Vi and the PN code string to figure it out as a numerical value, and if the value is larger than a predetermined threshold value and the correlation is judged to be large, then the spectrally spread additional information is judged to be superimposed, on the other hand, if the value is smaller than the above-mentioned threshold value, then the spectrally spread additional information is judged not to be superimposed on the video signal.

The degree of correlation is judged for each predetermined size of the video data, for example, 1 sample of the video signal or 1 chip of the PN code string, and if a correlation is detected, then the degree of correlation can be represented as a numeral value by adding an increment to the count value. The value is considered to be a value which represents the degree of correlation as it is. A video signal having deteriorated additional information spectrally spread and superimposed on the video signal is judged to be a video signal on which no additional information is superimposed. In this example, the above-mentioned threshold value is assumed to be set on the sum calculated over 1 field interval.

In the first embodiment, the information indicating whether additional information is superimposed on a video signal or not superimposed on the video signal namely the inverse spread detection result obtained by the above-mentioned SS additional information detection unit 11 is supplied to the superimposition ON/OFF control unit 14.

The superimposition ON/OFF control unit 14 determines whether the spectrally spread additional information generated by the SS additional information generation unit 12 should be superimposed again on the input video signal based on the detection result information supplied from the SS additional information detection unit 11.

In detail, in the first embodiment, if the SS additional information detection unit 11 detects surely that the additional information is superimposed already on the input video signal Vi, then the superimposition ON/OFF control unit 14 does not supply the additional information to the addition unit 15 so that the spectrally spread additional information generated by the SS additional information generation unit 12. On the other hand, if the SS additional information detection unit 11 detects that the additional information is not superimposed on the input video signal Vi, then the superimposition ON/OFF control unit 14 supplies the spectrally spread additional information generated by the SS additional information generation unit 12 to the addition unit 15 so that the spectrally spread additional information generated by the SS additional information generation unit 12 is superimposed on the input video signal Vi.

Upon receiving supply of the spectrally spread additional information through the superimposition ON/OFF control unit 14, the addition unit 15 performs a process to superimpose the spectrally spread additional information on the input video signal Vi.

In this case, the superimposition level of the SS additional information is as low as the level which does not deteriorate the picture of the video signal.

Figure 6A:
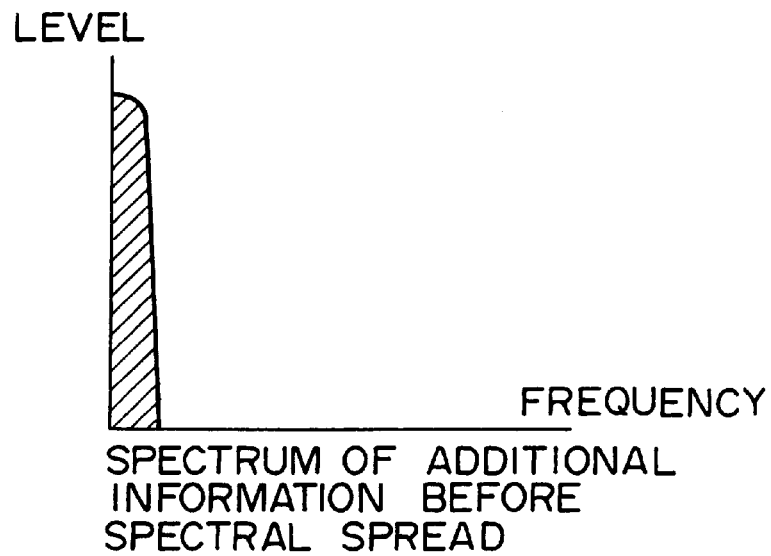
FIGS. 6A to 6D are spectral diagrams for describing the relation between the SS anti-duplication control signal and the information signal.
Figure 6B:
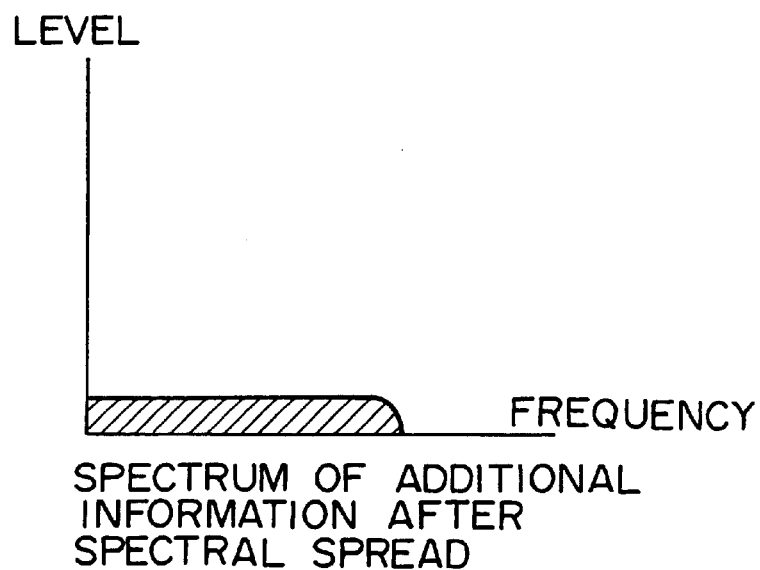
Figure 6C:
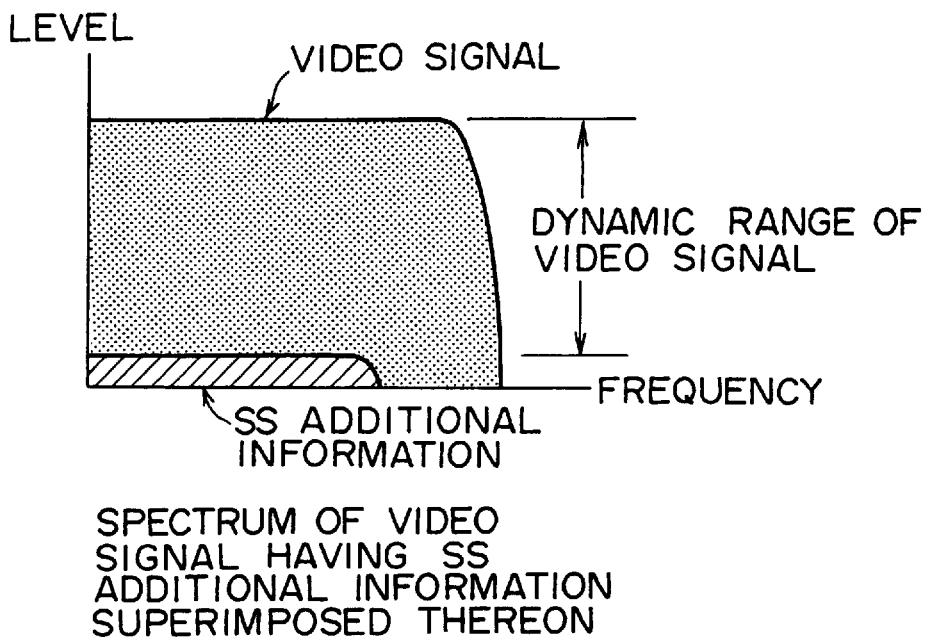

FIGS. 6A–6D show the relation between the SS additional information and the video signal. For example, the anti-duplication control signal used as additional information contains a little information and a signal of low bit rate, and a narrow-band signal as shown in FIG. 6(A). The additional information is changed to a wide-band signal as shown in FIG. 6(B) by spectral spread. When, the spectrally spread signal level is reduced inversely proportional to the enlargement ratio of the band.

The spectrally spread signal namely the spectrally spread anti-duplication control signal is superimposed on the video signal by the addition unit 15, when, the spectrally spread anti-duplication control signal is superimposed with a level lower than the dynamic range of the video signal. By superimposing in this way, the superimposition does not cause deterioration of the video signal. When the video signal having the spectrally spread anti-duplication control signal superimposed thereon is supplied to a monitor receiver and is played back, a good played back picture is obtained without adverse effect of the SS anti-duplication control signal.

Figure 6D:
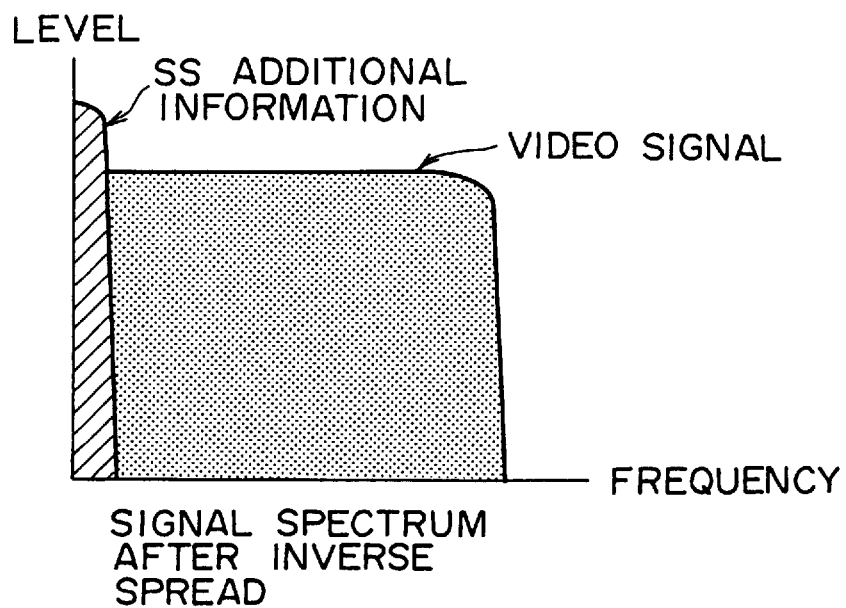

As described hereinafter, inverse spectral spread performed to detect the spectrally spread anti-duplication control signal restores the SS additional information to the narrow-band signal as shown in FIG. 6(D). By providing a sufficient band spread, the power of the anti-duplication control signal after inverse spread exceeds the video signal, and the anti-duplication control signal can be detected.

In this case, the SS additional information superimposed on the video signal is superimposed on the same time and the same frequency as those of the video signal, it is difficult to remove or change the SS additional information with a frequency filter or simple replacement of the information.

The SS additional information superimposed on the video signal will not therefore be removed, the SS additional information, for example, the SS anti-duplication control signal is provided surely to a device such as a monitor receiver or recording device.

The structure that the SS additional information detection unit 11 outputs the information of the degree of correlation to the superimposition ON/OFF control unit 14 as it is, and the superimposition ON/OFF control unit 14 determines whether the SS additional information is superimposed based on the degree of correlation may be used.

Figure 7:
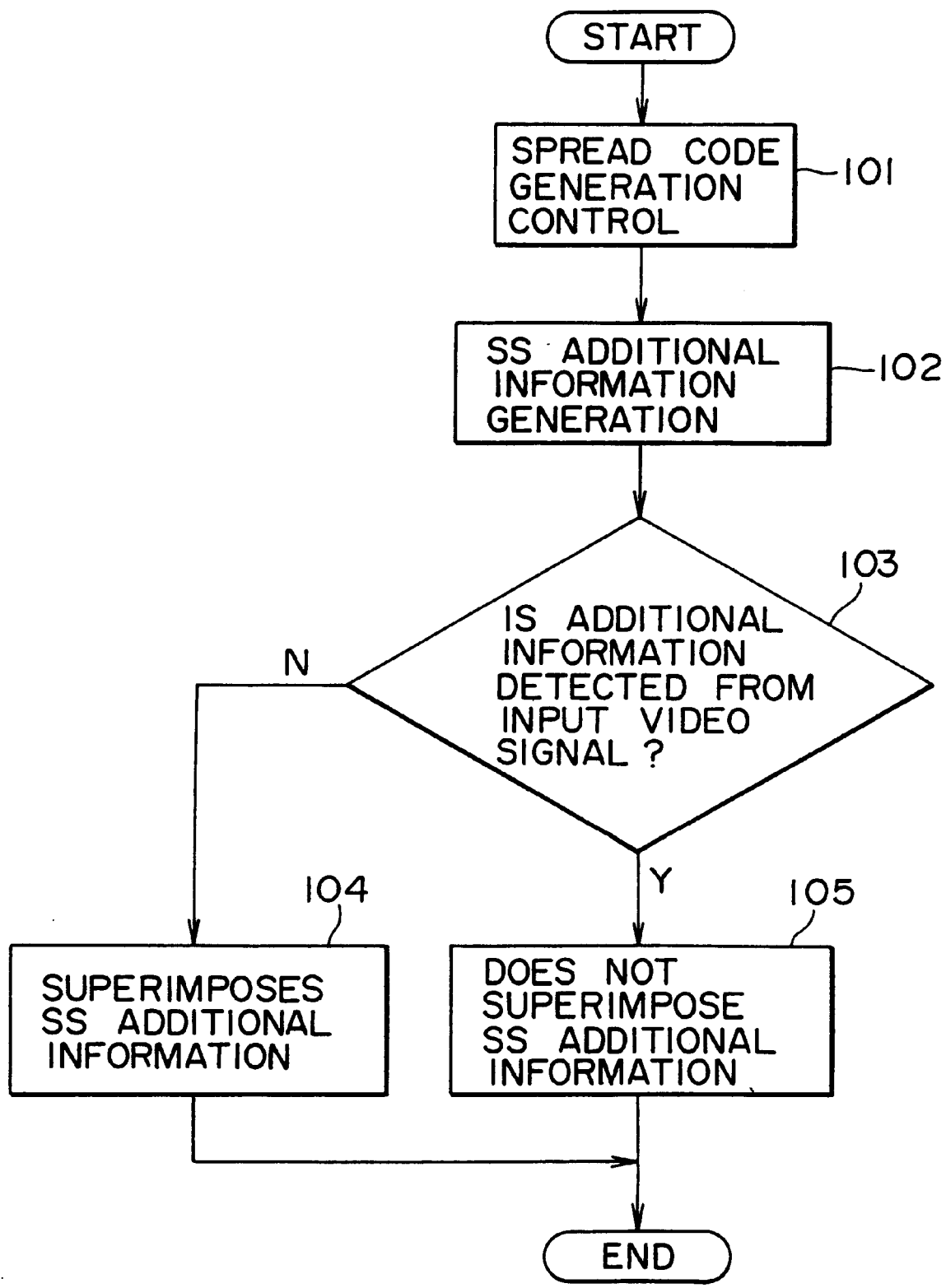
FIG. 7 is a flow chart of the first embodiment realized using a software.

The structure of the first embodiment can be realized using a micro-computer. FIG. 7 is a flow chart for describing processing operations of the micro-computer in this case.

In detail, first in the step 101 the generation control of the PN code string PS for spectral spread is performed. That is, the timing synchronous to the video sync signal is generated. Then in the next step 102, spectral spread is performed using the PN code string PS which generates the additional information to generate the SS additional information.

Next, the sequence proceeds to the step 103, the input video signal is subjected to inverse spread using the above-mentioned PN code string PS, and whether the additional information is detectable is judged as described hereinbefore. As the judgment result, if no additional information is detected, then the sequence proceeds to the step 104, and the generated SS additional information is superimposed on the video signal Vi. On the other hand, as the judgment result in the step 103, if the additional information is detected, then the sequence proceeds to the step 105, and the generated SS additional information is not superimposed on the video signal Vi.

As described hereinbefore, in the first embodiment, in the case that the sufficiently detectable spectrally spread additional information is superimposed on the input video signal, the additional superimposition of the SS additional information is not performed and thus deterioration of the video signal due to additional superimposition is prevented.

[Second embodiment]

In the above-mentioned first embodiment, whether the SS additional information is superimposed on the input video signal Vi is detected, and based on the detection results whether the SS additional information should be superimposed additionally is judged. However, in the first embodiment, assuming that the SS additional information is deteriorated due to the characteristics of the transmission path through which the video signal Vi is transmitted, insufficient restoration of the additional information or deterioration of the picture of the video signal can occur depending on the selection of the threshold value for judging whether the SS additional information is superimposed.

Figure 8:
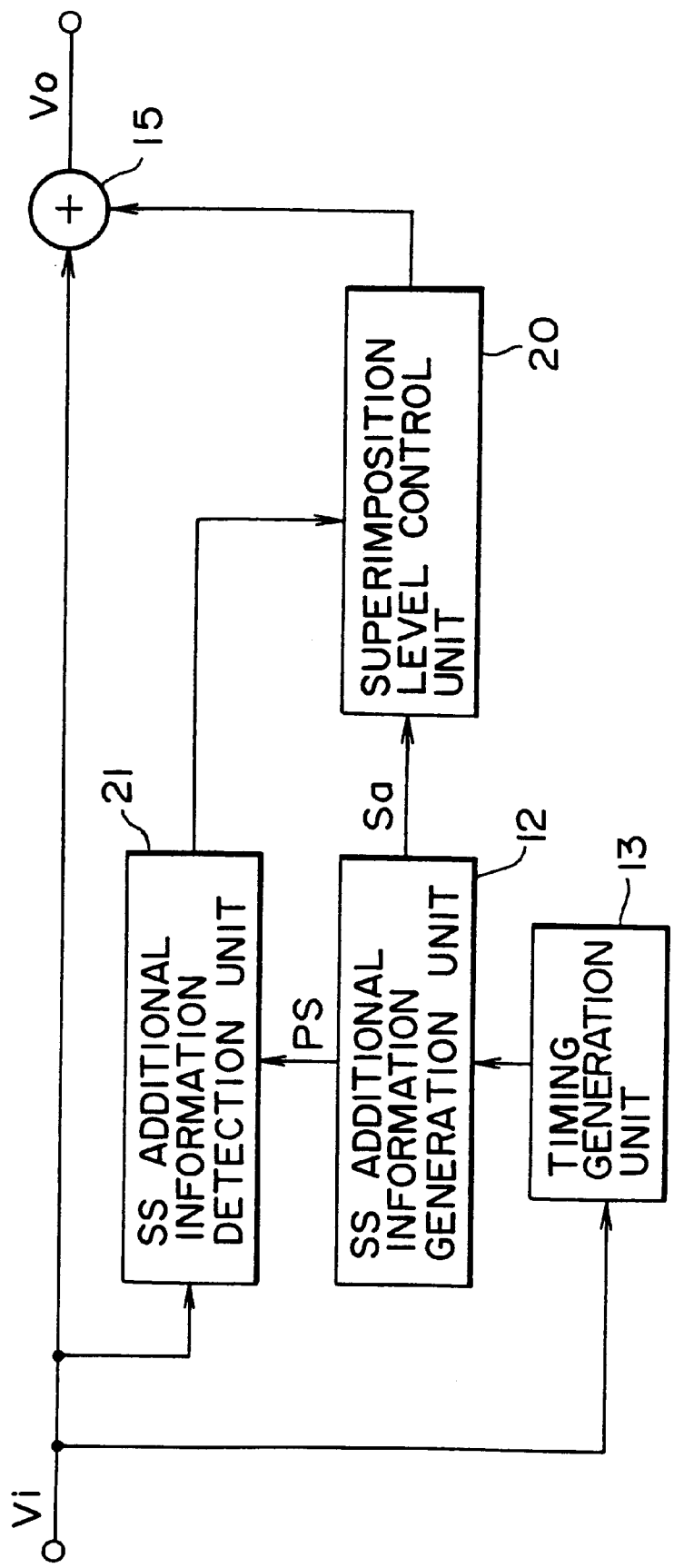
FIG. 8 is a block diagram for illustrating the second embodiment of an additional information superimposition device in accordance with the present invention.

This second embodiment eliminates such problem. FIG. 8 is a block diagram for illustrating the structure of an additional information superimposition device of the second embodiment.

In detail, the second embodiment is provided with a superimposition level control unit 20 instead of the superimposition ON/OFF control unit 14. An SS additional information detection unit 21 of the second embodiment does not detect whether the SS additional information is superimposed based on the comparison with the threshold value unlike the SS additional information detection unit 11 of the first embodiment, but outputs the above-mentioned degree of correlation information to the superimposition level control unit 20 as it is. The superimposition level control unit 20 controls the level of the SS additional information to be superimposed on the video signal Vi based on the degree of correlation information. The second embodiment has the same structure as that of the first embodiment excepting the components mentioned above.

In the second embodiment, if the superimposition level control unit 20 detects that the SS additional information is superimposed on the video signal, is not significantly deteriorated, and has a sufficient level for restoring surely the additional information by inverse spread based on the degree of correlation information, then the SS additional information supplied from the SS additional information generation unit 12 is not supplied to the addition unit 15, and additional superimposition of the SS additional information is inhibited.

On the other hand, if the superimposition level control unit 20 detects that, though the SS additional information is superimposed on the video signal, the SS additional information is deteriorated and has the insufficient level for restoring surely the additional information as it is by inverse spread based on the degree of correlation information, then the SS additional information generated by the SS additional information generation unit 12 is supplied to the addition unit 15 with the level corresponding to the superimposition level.

For example, assuming that superimposition of the SS additional information of 2 mV on 1 Vp-p video signal is the reference level which satisfies the condition shown in FIG. 7, if the superimposition level control unit 20 judges that 70% superimposition level is sufficient for detection of the SS additional information based on the degree of correlation information, then the SS additional information Sa is supplied to the addition unit 15 with the superimposition level of 1.4 mV namely 2 mV×0.7.

Further, in the case that the SS additional information is regarded to be not superimposed on the video signal based on the degree of correlation information, the superimposition level control unit 20 supplies the SS additional information generated by the SS additional information unit 12 to the addition unit 15 with the original superimposition level, and superimposes it on the video signal Vi.

The structure of the second embodiment can be also realized using a micro-computer. The FIG. 9 is a flow chart for describing the processing operation of the micro-computer in this case.

In detail, first the generation control of the PN code string PS for spectral spread is performed in the step 201. That is, the timing which is synchronous to the video sync signal is generated. In the next step 202, the SS additional information is generated by spectral spread using the PN code string PS which generates the additional information.

Next, the sequence proceeds to the step 203, inverse spread is performed on the input video signal using the above-mentioned PN code string PS to detect the information of degree of correlation between the input video signal Vi and the PN code string PS. In the next step 204, the superimposition level of the SS additional information from the SS additional information generation unit 12 is adjusted using the detection result namely the degree of correlation information.

As described herein above, even though the additional information is deteriorated due to the low-pass filter characteristics of the transmission path for transmitting the video signal on which the SS additional information is superimposed, the second embodiment compensates the deterioration of the additional information while the level is suppressed so that the picture of the video signal is prevented from being deteriorated.

In the above-mentioned description, though the superimposition level control unit 20 judges the degree of correlation, and the superimposition level of the SS additional information Sa is adjusted correspondingly to the judgment result, the structure that the superimposition level control unit is structured previously so as to set the superimposition level to a plurality of ranks, the SS additional information detection unit 11 detects the degree of correlation corresponding to the above-mentioned superimposition level in the plurality of ranks, and supplies the rank corresponding to the degree of correlation to the superimposition level control unit 20, and the superimposition level control unit 20 selects the superimposition level may be used.

[Third embodiment]

The third embodiment is also an embodiment involving the deterioration of the SS additional information due to the characteristics of the transmission path for transmission of the video signal Vi like the above-mentioned second embodiment.

Figure 10:
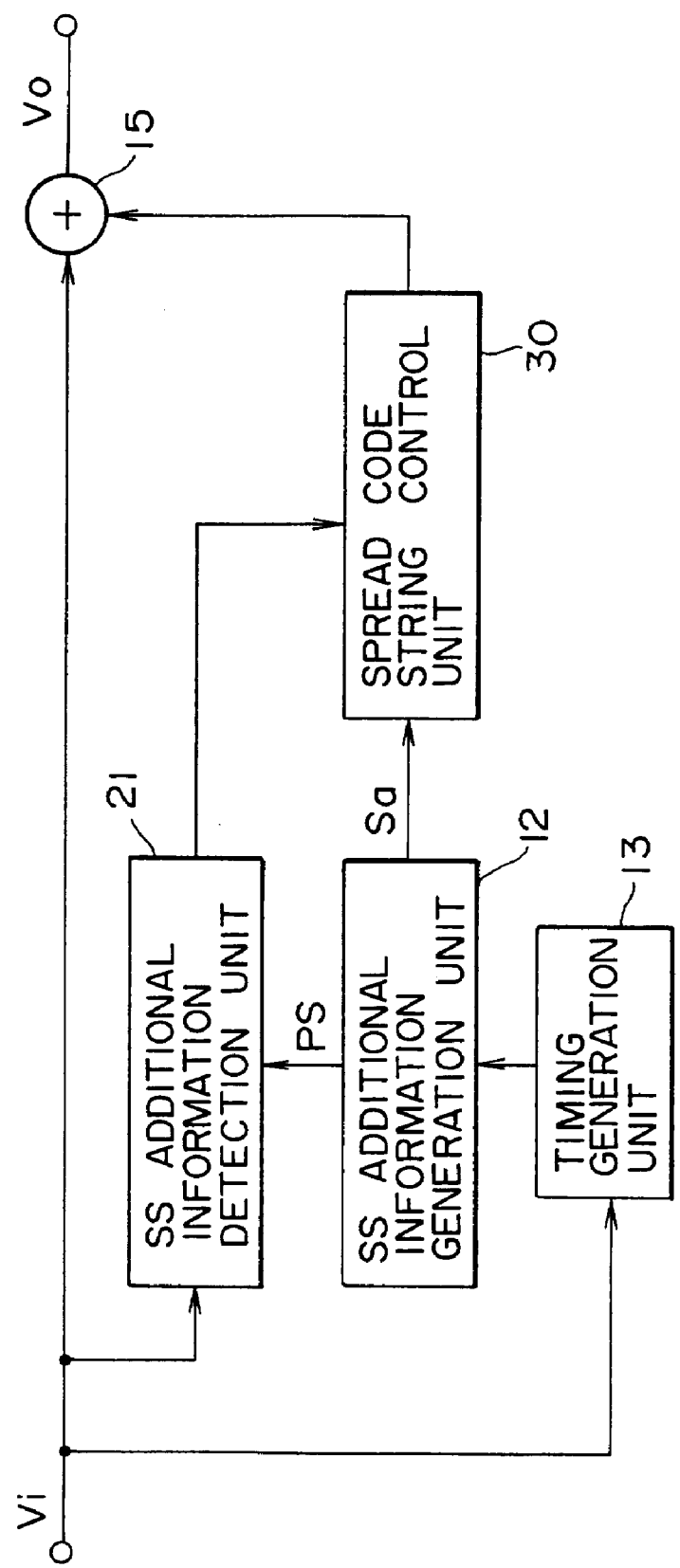
FIG. 10 is a block diagram for illustrating the third embodiment of additional information in accordance with the present invention.

FIG. 10 is a block diagram for illustrating the structure of an additional information superimposition device of the third embodiment.

In detail, the third embodiment has the same structure as that of the second embodiment excepting that a spread code string control unit 30 is provided instead of the superimposition level control unit 20 in the second embodiment.

In the third embodiment, if the spread code string control unit 30 detects that the SS additional information is superimposed on the video signal, is not deteriorated seriously, and has a sufficient level for consistent restoration of the additional information by performing inverse spread based on the degree of correlation information supplied from the SS additional information detection unit 21, then the SS additional information supplied from the SS additional information generation unit 12 is not supplied to the addition unit 15, and the additional superimposition of the SS additional information is inhibited.

On the other hand if the spread code string control unit 30 detects that, though the SS additional information is superimposed on the video signal, the SS additional information is deteriorated and has an insufficient level for restoring consistently the additional information as it is by performing inverse spread based on the degree of correlation information, then the level of the SS additional information is adjusted so that the code string level becomes a sufficient level for detection, and the SS additional information generated by the SS additional information generation unit 12 is supplied to the addition unit 15.

For example, in the case that if the SS additional information generated by the SS additional information generation unit 12 is superimposed as it is, the picture of the video signal is deteriorated because of excessive superimposition level, and the spread code string control unit 30 judges that about 60% increment of additional superimposition is optimal, then the spread code string control unit 30 changes forcedly the spread code of 20% code [1] to the code [0] in order to reduce the gain by 40%, the SS additional information generated by the SS additional information generation unit 12 is supplied to the addition unit 15.

Further, in the case that the SS additional information is regarded to be not superimposed on the video signal based on the degree of correlation information, the spread code string control unit 30 supplies the SS additional information generated by the SS additional information generation unit 12 to the addition unit 15 as it is, and the SS addition information is superimposed on the video signal Vi.

The structure of the third embodiment is also realized using a micro-computer. FIG. 11 is a flow chart for describing the processing operation of the micro-computer in this case.

In detail, first the generation control of the PN code string PS for spectral spread is performed in the step 301. That is, the timing which is synchronous to the video sync signal is generated. In the next step 302, SS additional information is generated by spectral spread using the PN code string PS which generates the additional information.

Next, the sequence proceeds to the step 303, inverse spread processing is performed on the input video signal using the above-mentioned PN code string PS to detect the information of degree of correlation between the input video signal Vi and the PN code string PS. In the next step 304, the spread code string of the SS additional information supplied from the SS additional information generation unit 12 is adjusted as described herein above using the detection result namely the degree of correlation information.

As described herein above, even though the additional information is deteriorated due to the low-pass filter characteristics of the transmission path for transmitting the video signal on which the SS additional information is superimposed, the third embodiment compensates the deterioration of the additional information while the level is suppressed so that the picture of the video signal is prevented from being deteriorated.

Though spectral spread is performed using the PN code string which is synchronous to the vertical sync signal of the video signal in the above-mentioned embodiment, the PN code string may be synchronous to the horizontal sync signal. The period of the PN code string may be a plurality of vertical periods or a plurality of horizontal periods instead of 1 vertical period or 1 horizontal period.

In the above-mentioned description, the case that the additional information having the same content is additionally superimposed is described, however, the present invention is applied to the case that the additional information of the same type having the different meaning content may be spectrally spread using the spread code string of the same PN code string.

The above-mentioned embodiments involve the additional information used as the information for duplication prevention, for example, anti-duplication control information or copyright information, however, the additional information used for other purposes may be used. In other words, the present invention can be applied to all the cases that spectrally spread and superimposed various additional information is transmitted.

The additional information superimposition device of the present invention is applicable to playback devices and recording devices of video signals, and also applicable to the transmission of video signals through a network.

As described hereinbefore, according to the present invention, in the case that the SS additional information is already superimposed on the video signal, deterioration of the picture such as turbulence due to superimposition of the SS additional information is suppressed by controlling the additional superimposition so as not to be excessive.

What is claimed is:

1. An additional information signal superimposition device comprising:

spectral spread signal generation means for generating a spectral spread additional information signal by spectrally spreading an additional information signal;

spectral spread signal detection means for detecting the spectral spread additional information signal superimposed on an input information signal; and superimposition means for receiving said spectral spread additional information signal from said spectral spread generation means and for additionally superimposing said spectral spread additional information signal on said input information signal when it is determined based on the detection result obtained by said spectral spread signal detection means that said spectral spread additional information signal is not superimposed on said input information signal to a predetermined threshold value of correlation.

2. The additional information signal superimposition device as claimed in claim 1, wherein said input information signal is a video signal, and said spectral spread signal generation means comprises:

timing generation means for generating a timing signal based on said video signal;

PN code string generation means for generating a PN code string based on the timing signal supplied from said timing generation means; and multiplication means for generating said spectral spread additional information signal by spectrally spreading said additional information using the PN code string supplied from said PN code string generation means.

3. The additional information signal superimposition device as claimed in claim 1, wherein said superimposition means comprises:

output control means for selectively outputting said spectral spread additional information signal in response to the detection result obtained by said spectral spread signal detection means; and addition means for superimposing said spectral spread additional information signal outputted from said output control means on said input information signal.

4. The additional information signal superimposition device as claimed in claim 3, wherein:

said input information signal is a video signal, and said spectral spread signal generation means comprises:

timing generation means for generating a timing signal based on said video signal;

PN code string generation means for generating a PN code string based on the timing signal supplied from said timing generation means; and multiplication means for generating said spectral spread additional information signal by spectrally spreading said additional information using the PN code string supplied from said PN code string generation means.

5. The additional information signal superimposition device as claimed in claim 1, wherein said superimposition means comprises:

superimposition level control means for outputting a level of said spectral spread additional information signal from said spectral spread generation means adjusted correspondingly to a detection result obtained by said spectral spread signal detection means; and additional means for superimposing said spectral spread additional information signal outputted from said superimposition level control means on said input information signal.

6. The additional information signal superimposition device as claimed in claim 5, wherein:

said input information signal is a video signal, and said spectral spread signal generation means comprises:

timing generation means for generating a timing signal based on said video signal;

PN code string generation means for generating a PN code string based on the timing signal supplied from said timing generation means; and multiplication means for generating said spectral spread additional information signal by spectrally spreading said additional information using the PN code string supplied from said PN code string generation means.

7. The additional information signal superimposition device as claimed in claim 1, wherein said superimposition means comprising:

spread code string control means for converting a code 1 of said spectral spread additional information signal to a code 0 to output correspondingly to the detection result obtained by said spectral spread signal detection means on said input spectral spread additional information signal; and addition means for superimposing said converted spectral spread additional information signal outputted from said spread code string control means on said input information signal.

8. The additional information signal superimposition device as claimed in claim 7, wherein:

said input information signal is a video signal, and said spectral spread signal generation means comprises:

timing generation means for generating a timing signal based on said video signal;

PN code string generation means for generating a PN code string based on the timing signal supplied from said timing generating means; and multiplication means for generating said spectral spread additional information signal by spectrally spreading said additional information using the PN code string supplied from said PN code string generation means.

* * * * *